United States Patent
Sakaguchi

(10) Patent No.: US 7,345,704 B2
(45) Date of Patent: Mar. 18, 2008

(54) IMAGING APPARATUS FOR CAPTURING AN OBJECT WITH LOW LUMINANCE BY ADDING PIXELS OF THE SAME COLOR FROM DIFFERENT FIELDS

(75) Inventor: Norihiro Sakaguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 739 days.

(21) Appl. No.: 10/761,329

(22) Filed: Jan. 22, 2004

(65) Prior Publication Data
US 2005/0078201 A1 Apr. 14, 2005

(30) Foreign Application Priority Data
Jan. 29, 2003 (JP) ............... 2003-021152

(51) Int. Cl.
*H04N 9/083* (2006.01)
*H04N 5/228* (2006.01)

(52) U.S. Cl. ............... 348/282; 348/273; 348/208.12

(58) Field of Classification Search ............ 348/229.1, 348/216.1, 363–366, 208.12, 216, 273, 280, 348/281
See application file for complete search history.

(56) References Cited

U.S. PATENT DOCUMENTS

| | | | |
|---|---|---|---|
| 5,534,916 A | 7/1996 | Sakaguchi | |
| 5,774,623 A | 6/1998 | Maeda et al. | |
| 6,075,562 A | 6/2000 | Sakaguchi et al. | |
| 6,130,420 A * | 10/2000 | Tanaka et al. | 250/208.1 |
| 6,532,264 B1 * | 3/2003 | Kahn | 375/240.16 |
| 7,057,645 B1 * | 6/2006 | Hara et al. | 348/208.6 |
| 2003/0030737 A1 * | 2/2003 | Yanai | 348/296 |
| 2003/0133021 A1 * | 7/2003 | Hamamura et al. | 348/229.1 |
| 2003/0202108 A1 * | 10/2003 | Maeda | 348/216.1 |
| 2006/0285007 A1 * | 12/2006 | Yuyama et al. | 348/362 |
| 2007/0077055 A1 * | 4/2007 | Tominaga et al. | 396/256 |

FOREIGN PATENT DOCUMENTS

JP 2007049648 A * 2/2007

* cited by examiner

Primary Examiner—John M. Villecco
(74) Attorney, Agent, or Firm—Oblon, Spivak, McClelland, Maier & Neustadt, P.C.

(57) ABSTRACT

In the present invention, first of all, an image in each field is monitored by carrying out monitoring. An evaluation value of an AE is calculated from a result of the monitoring, and if the result of the calculation shows that the image is not in low luminance, data in each of the fields is read out by carrying out an exposure, and a normal process for a still image is performed. If the result of the calculation shows that the image is in the low luminance, the exposure and read out of the field data such as a difference in a luminance in each of the fields are carried out, and first and second field data are compared. Then, whether an object moves or not is determined from a result of the comparison, and if the object is determined to be moved, the normal process for the still image is performed. If the object is determined not to be moved, the entire field data from the first to third field data are added.

10 Claims, 7 Drawing Sheets

FIG. 3A

| 10 (A) | Gb | B  | Gb | B  |
|--------|----|----|----|----|
| 7 (A)  | R  | Gr | R  | Gr |
| 4 (A)  | Gb | B  | Gb | B  |
| 1 (A)  | R  | Gr | R  | Gr |

FIG. 3B

| 11 (B) | R  | Gr | R  | Gr |
|--------|----|----|----|----|
| 8 (B)  | Gb | B  | Gb | B  |
| 5 (B)  | R  | Gr | R  | Gr |
| 2 (B)  | Gb | B  | Gb | B  |

FIG. 3C

| 12 (C) | Gb | B  | Gb | B  |
|--------|----|----|----|----|
| 9 (C)  | R  | Gr | R  | Gr |
| 6 (C)  | Gb | B  | Gb | B  |
| 3 (C)  | R  | Gr | R  | Gr |

FIG. 7A

| Gb | R | Gb | R |
| B | Gr | B | Gr |
| Gb | R | Gb | R |
| B | Gr | B | Gr |

FIRST FIELD

| Gb | R | Gb | R | Gb |
| B | Gr | B | Gr | B |
| Gb | R | Gb | R | Gb |
| B | Gr | B | Gr | B |

20

SECOND FIELD

| Gb | R | Gb | R |
| B | Gr | B | Gr |
| Gb | R | Gb | R |
| B | Gr | B | Gr |

THIRD FIELD

IMAGING APPARATUS FOR CAPTURING AN OBJECT WITH LOW LUMINANCE BY ADDING PIXELS OF THE SAME COLOR FROM DIFFERENT FIELDS

BACKGROUND OF THE INVENTION

1. Field of the Invention

The present invention relates to an imaging apparatus, more specifically, to an enhancement in sensitivity and a reduction in power consumption of an imaging apparatus such as a digital camera or the like.

2. Description of the Prior Art

In recent years, a CCD has been used mostly for an image pick-up device used in an imaging apparatus of a digital camera and the like. However, sensitivity is generally insufficient in the CCD. For example, there is a case that a sufficient luminance cannot be obtained with 1/30 seconds of an exposure on a dark object even though it may be recognized fully by a human.

To solve such a case, it is known that an extension of a storage time of the CCD is an effective measure.

However, it is difficult to take beautiful photographs due to blurring caused by shaking or an influence by a movement of an object even if the sufficient luminance is obtained by extending and setting the storage time to 1 second.

Also, if a limitation is set to the storage time to avoid influences such as the blurring by the shaking, there is a problem that S/N of the photographs becomes poor, since a gain has to be applied by a processing device like AGC (Automatic Gain Control).

SUMMARY OF THE INVENTION

The present invention has been made in view of the above mentioned circumstances; therefore, it is an object of the present invention to provide an imaging apparatus capable of taking photographs in fine S/N even an object in low luminance without minding about blurring by shaking.

In the present invention, first of all, an image in each field is monitored by carrying out monitoring. An evaluation value of an AE is calculated from a result of the monitoring, and if the result of the calculation shows that the image is not in low luminance, data in each of the fields is read out by carrying out an exposure, and a normal process for a still image is performed. If the result of the calculation shows that the image is in the low luminance, the exposure and read out of the field data such as a difference in a luminance in each of the fields are carried out, and first and second field data are compared. Then, whether an object moves or not is determined from a result of the comparison, and if the object is determined to be moved, the normal process for the still image is performed. If the object is determined not to be moved, the entire field data from the first to third field data are added.

BRIEF DESCRIPTION OF THE DRAWINGS

FIG. 3A is a diagram showing output signals from a first field of the present invention.

FIG. 3B is a diagram showing output signals from a second field of the present invention.

FIG. 3C is a diagram showing output signals from a third field of the present invention.

FIG. 7A is a pattern diagram explaining an addition for adding same-colored pixels in the digital camera of the present invention.

FIG. 7B is a pattern diagram explaining the addition for adding the same-colored pixels in the digital camera of the present invention.

FIG. 7C is a pattern diagram explaining the addition for adding the same-colored pixels in the digital camera of the present invention.

DESCRIPTION OF THE PREFERRED EMBODIMENT

Figure 1:
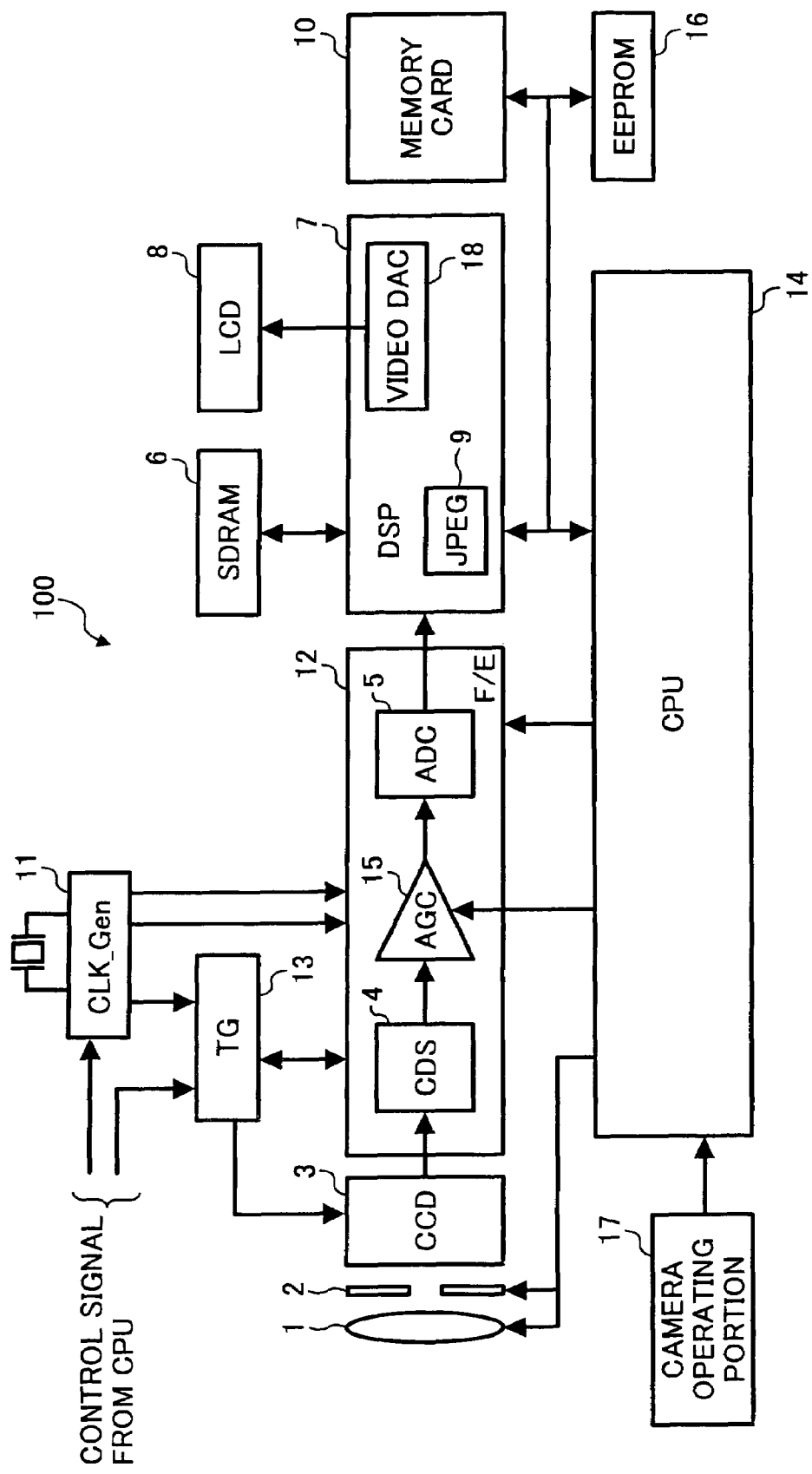
FIG. 1 is a block diagram of a digital camera according to an embodiment of the present invention.

Hereinafter, the present invention will be described in detail in accordance with an embodiment shown in the drawings. However, it should be understood that structural elements, kinds, combinations, configurations or their relative arrangements described in the embodiment are merely an example for explanation, thus it is not intended to limit scopes of the present invention by only them unless otherwise specifically stated.

FIG. 1 illustrates a digital camera 100 according to the present invention. This digital camera 100 is structured by having a lens 1 for condensing an optical image of an object, an aperture stop portion 2 for focusing a luminous flux condensed by the lens 1, a CCD (Charge Coupled Device) 3 for carrying out photoelectric conversion to the optical image passed through the lens 1 and the aperture stop portion 2, a CDS (Correlated Double Sampling) 4 for reducing a noise included in the CCD 3, an AGC (Automatic Gain Control) 15, an A/D converter (ADC) 5 for converting an analog signal outputted from the CCD 3 to a digital signal. Moreover, the digital camera 100 is provided with a timing generator (TG) 13 for generating timing for the above mentioned CCD 3, CDS 4, AGC 15 and A/D converter 5, a digital signal processing circuit (DSP) 7 for carrying out image processing pursuant to a parameter of the image processing, a frame memory (SDRAM) 6 for recording imaged pixels and storing an image processed with the image processing, a displaying portion 8 for displaying an imaged image by a LCD (Liquid Crystal Display), an image compression and decompression circuit 9 for compressing image data processed by the digital signal processing circuit 7 or decompressing it to an original image data, a memory card 10 for storing the compressed image data compressed by the image compression and decompression circuit 9, a CPU 14 for executing a predetermined control based on a control program, a EEPROM (Electrically Erasable and Programmable Read Only Memory) 16 for storing a parameter, a camera operating portion 17 provided with a release button and the like for an user to operate a main body of the camera, and a CLK Gen (clock generator) 11 which has a multiplexer inside thereof and which is capable of changing an output frequency by the control of the CPU 14.

Meanwhile, although a commonly used crystal oscillator may be used for a clock of the TG 13 for driving the CCD 3, the clock of the TG 13 is explained here that the clock of the TG 13 is structured to be generated by the CLK Gen 11 capable of outputting a variable frequency, to synchronize the DSP 7 with a system of the digital camera. A clock for peripheral devices such as an USB is also supplied to the DSP 7 from the CLK Gen 11 other than a clock for the system. This CLK Gen 11 has the multiplexer inside thereof, and can change the output frequency by the control of the CPU 14.

In addition, the CPU 14 is structured to have functions to perform respective calculations such as AE, AF or white balance, to set parameters to the DSP 7 and to a F/E 12 (Front/End: signal processing of the CCD), and to process operations operated by the user.

For the AE, as an example, an integrated value of a luminance signal is obtained by the DSP 7 from a signal of the CCD 3 while monitoring is carried out, and an aperture stop and an electronic shutter are controlled by the CPU 14 by setting the obtained integrated value as an evaluation value. Evaluation values for the AF and the white balance and the like are also created by the DSP 7 other than the evaluation value for the AE, and are calculated by the CPU 14.

Next, an example of an operation of the digital camera according to the embodiment of the present invention will be explained. The output signal outputted from the CCD 3 is converted from an analog to a digital by the A/D converter 5 via the CDS 4 and the AGC 15, and the converted digital signal is stored to the SDRAM 6 while keeping data pattern of the CCD 3. In normal processing of a still image, the luminance signal and a color signal are created by reading out data of the CCD 3 from the SDRAM 6, and the JPEG process is carried out thereto, and is recorded to the memory card 10.

In addition, data converted from raw data of the CCD 3 to RGB or YUV which are for displaying, is outputted from a Video DAC 18 provided inside of the DSP 7 and is displayed by the LCD 8.

Figure 2:
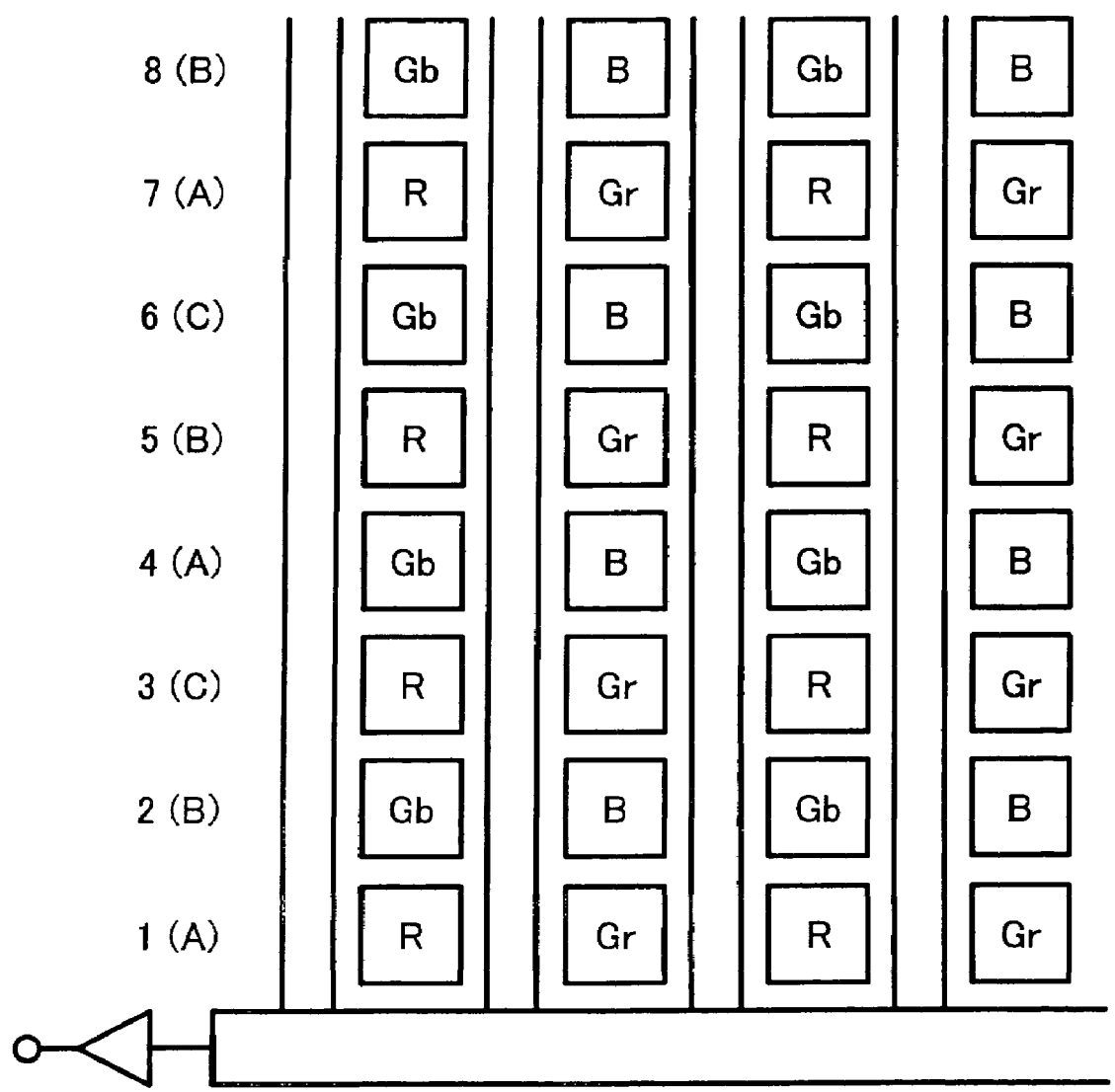
FIG. 2 is a diagram showing an inner structure of a CCD which reads out 3 fields in a Bayer pattern in the present invention.

FIG. 2 is a diagram showing an example of an inner structure of the CCD 3 which reads out 3 fields in a Bayer pattern. In this structure, a first field 1(A) is arranged with pixels in order from R, Gr, R to Gr and so on in a first line, a second field 2(B) is arranged with pixels in order from Gb, B, Gb, to B and so on in a second line, and a third field(C) is arranged with pixels in order from R, Gr, R to Gr and so on in a third line, and the arrangement is similarly repeated from then on. Here, although the arrangements of pixels in the first field 1(A) and the third field 3(C) are the same, they are arranged so as a two dimensional position becomes different.

As described above, the CCD 3 for reading out 3 fields structures 1 frame by the fields from the first field to the third field.

FIGS. 3A to 3C are diagrams showing output signals from each of the fields. FIG. 3A is a diagram showing the output signals from the first field, and shows that each of the signals of 1(A), 4(A), 7(A), 10(A) and so on in FIG. 2 are outputted. Similarly, FIG. 3B shows the output signals from the second field, and shows that each of the signals of 2(B), 5(B), 8(B), 11(B) and so on in FIG. 2 are outputted.

Also, FIG. 3C is a diagram which shows the output signals from the third field, and shows that each of the signals of 3(C), 6(C), 9(C), 12(C) and so on in FIG. 2 are outputted.

In this manner, entire pixels are read out by separating the 1 frame into the 3 fields such as the first field is for "(A)" lines, the second field is for "(B)" lines and the third field is for "(C)" lines.

In addition, because four colors of pixels, which are R, Gr, Gb and B, exist in every respective field, both the luminance signal and the color signal can be played.

Figure 4:
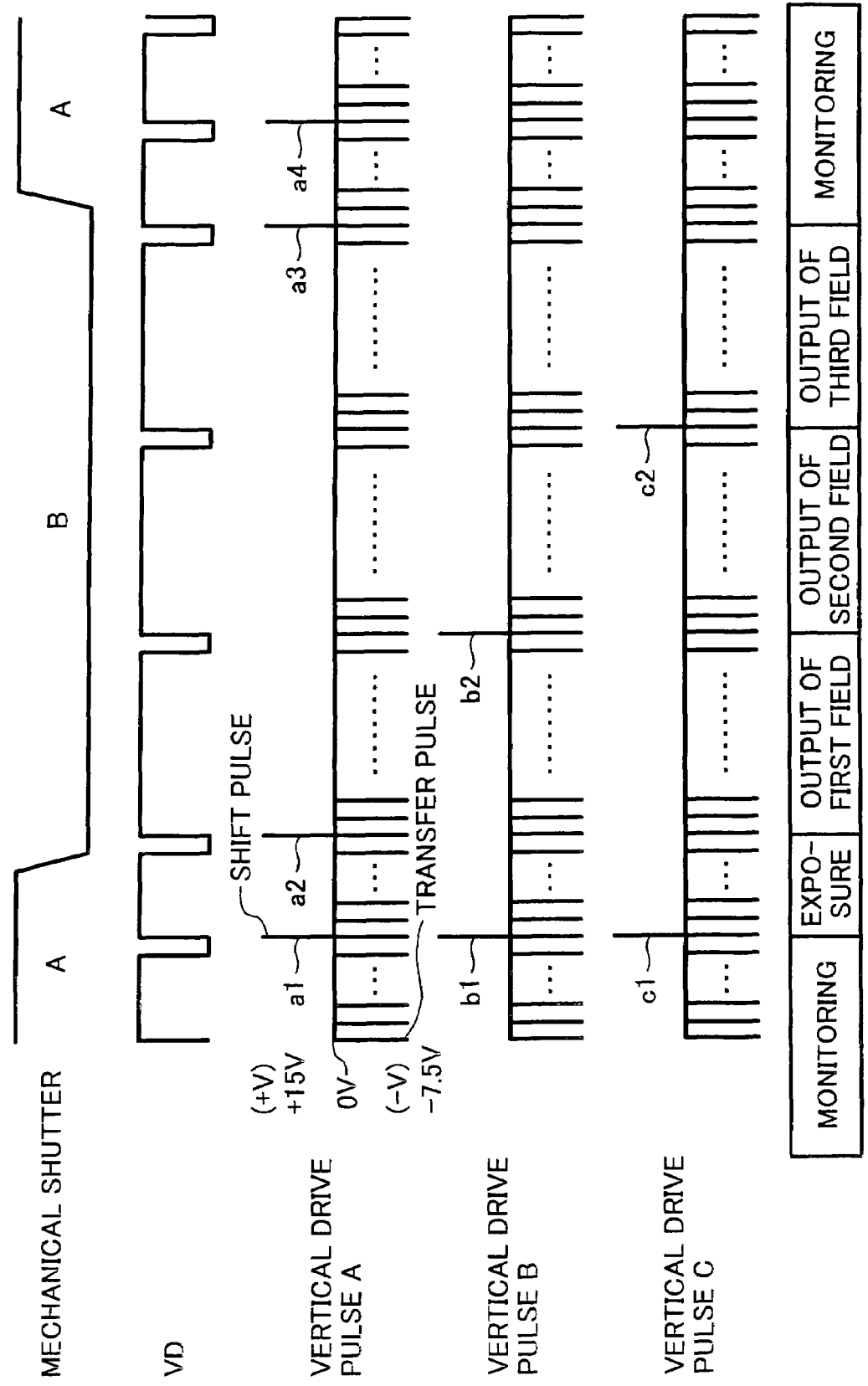
FIG. 4 is a timing chart of a read out representing a normal operation of the CCD which reads out 3 fields of the present invention.

FIG. 4 is a timing chart of a read out representing a normal operation of the CCD for reading out the 3 fields. A first line in FIG. 4 shows a wave pattern of an operation of a mechanical shutter, and "A" shown in the wave pattern represents that the shutter is open, and "B" represents that the shutter is shut. A second line shows a VD which represents an image data. Third to fifth lines represent vertical-drive pulses A-C respectively, and by setting center lines 0 V in respective wave patterns in each of the vertical-drive pulses A-C as a center, upper side of the center lines 0 V represents a "shift" pulse (+V), and lower side of the center lines 0 V represents a "transfer" pulse (−V). In addition, operations carried out while in each timing are shown at the bottom line.

Here, in a case of the vertical-drive pulse A as illustrated in FIG. 4, each of the pixels as illustrated in FIG. 2 is transferred to a register in order by means of a transfer pulse, and then shifted by means of a shift pulse A similar process is also performed on each of the other fields.

In the normal operation, the mechanical shutter is opened by an operation of monitoring, and the image VD is sequentially transferred to the register by the vertical-drive pulses A-C, and the transferred image VD is shifted by shift pulses a1-c1.

Then, the shifted image VD is sequentially transferred to the register by the respective vertical-drive pulses A-C by the timing of "exposure" shown in the bottom line of FIG. 4, and the mechanical shutter is shut, and the first field is outputted by a shift pulse a2. Subsequently, the second field is outputted by a shift pulse b2, and the third field is outputted by a shift pulse c2.

Moreover, the mechanical shutter is opened again to be moved on to monitoring. By the process described above, an image of the 1 frame is recorded to the memory.

Figure 5:
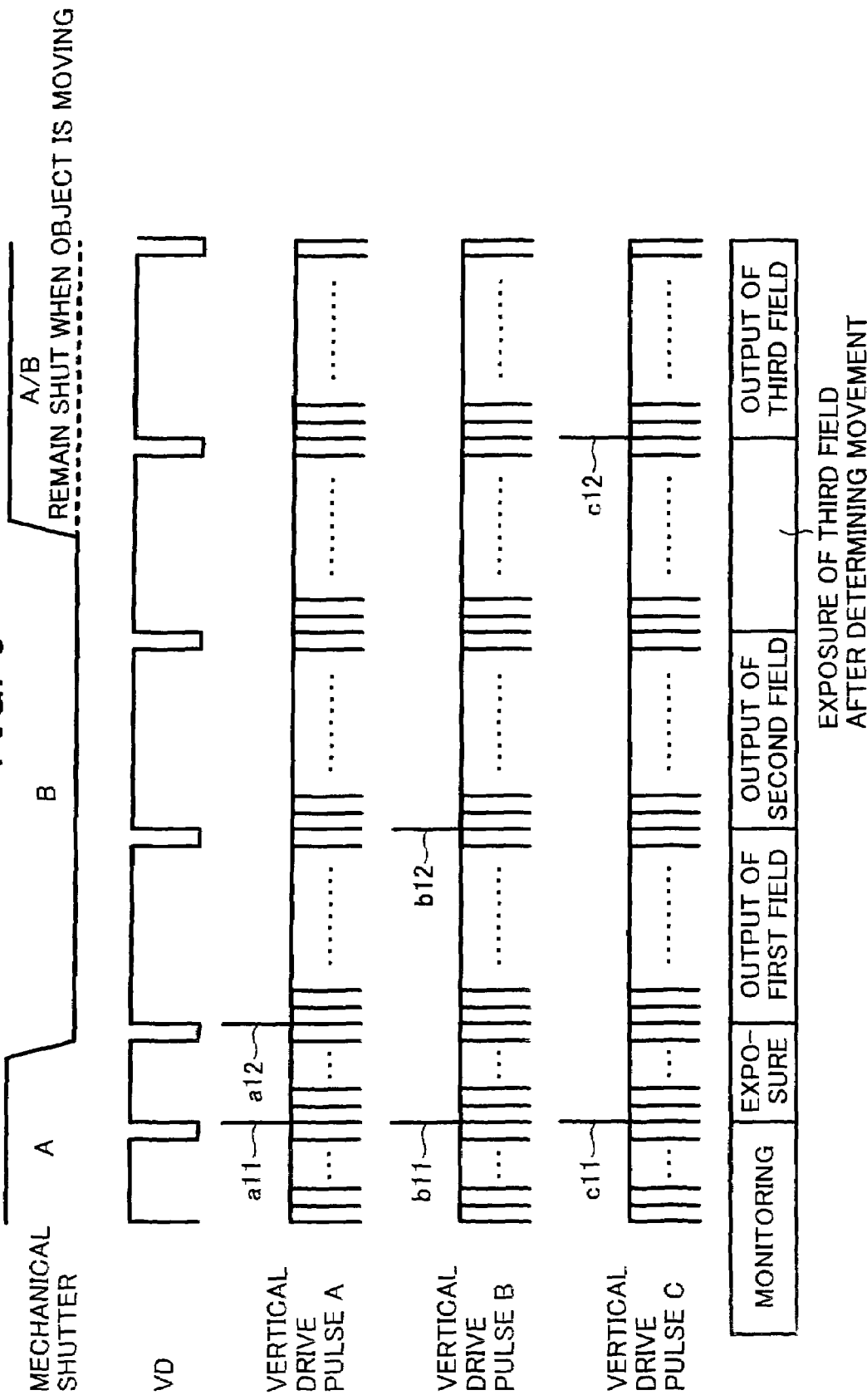
FIG. 5 is a timing chart of a read out to show an operation for re-exposing the third field of the CCD which reads out the 3 fields of the present invention.

FIG. 5 is a timing chart of a read out to show an operation for re-exposing the third field of the CCD which reads out the 3 fields. A point where this operation is different to the above mentioned normal operation is that this operation outputs the third field after carrying out the re-exposure by opening the mechanical shutter again if the object is not moved at the time of outputting the third field.

In this operation, at first, the mechanical shutter is opened by the operation of the monitoring, and the image VD is sequentially transferred to the register by the vertical-drive pulses A-C, and the transferred image VD is shifted by shift pulses a11-c11. In addition, the shifted image VD is sequentially transferred to the register by the respective vertical-drive pulses A-C by the timing of the "exposure", and the mechanical shutter is closed, and the first field is outputted by a shift pulse a12. Subsequently, the second field is outputted by a shift pulse b12. At this time, if the object is not moved, the third field is outputted by a shift pulse c12 after carrying out the re-exposure by opening the mechanical shutter again. As a result, an image of the 1 frame is recorded to the memory.

Figure 6:
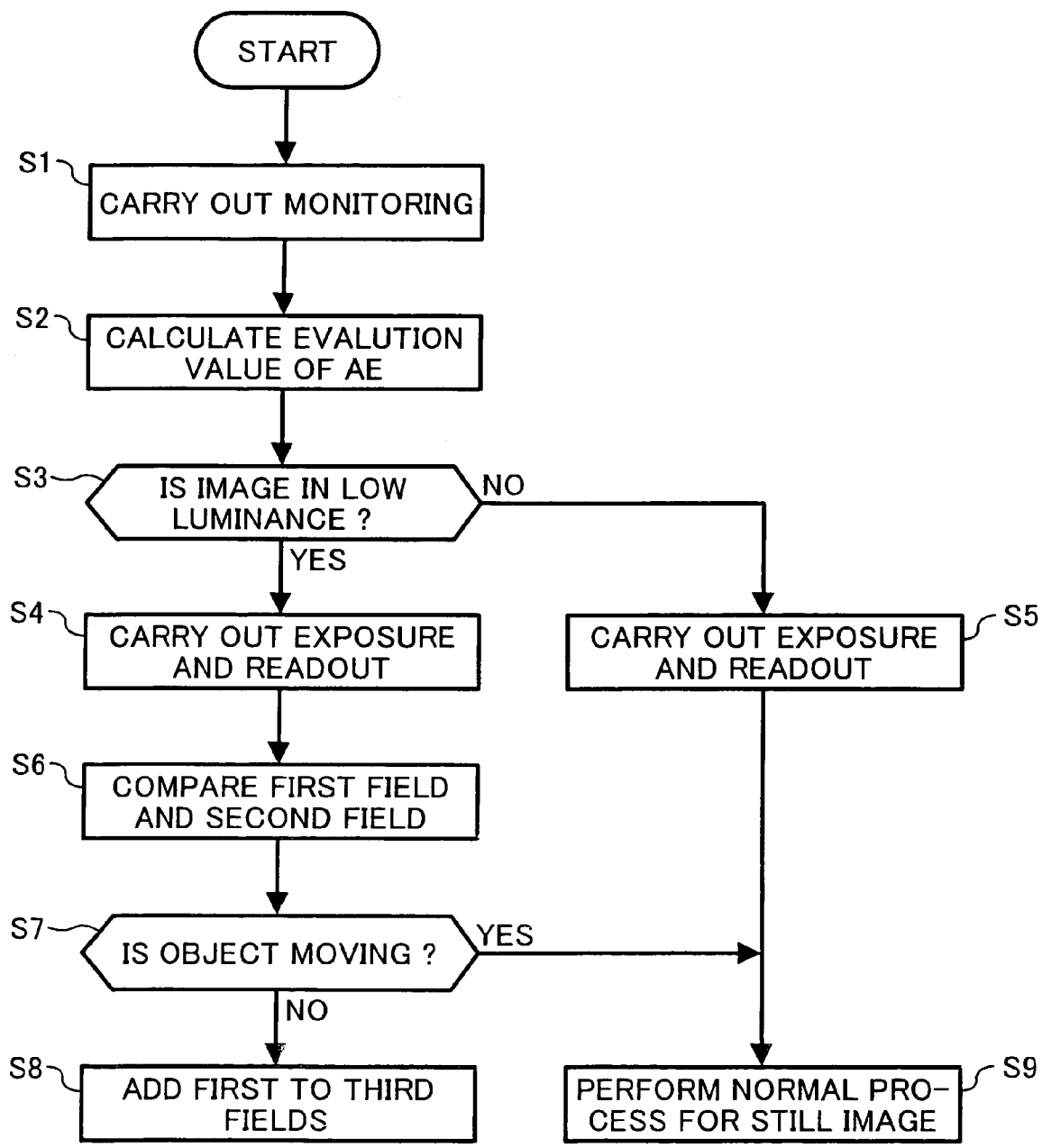
FIG. 6 is a flowchart of a read out representing a normal operation of the CCD for reading out 3 fields of the present invention.

FIG. 6 is a flowchart of a read out showing the normal operation of the CCD 3 for reading out 3 fields of the present invention.

First of all, the image in each of the fields is monitored by carrying out the monitoring (step S1). The evaluation value of the AE is calculated from a result of the monitoring (step S2), and if the result of the calculation shows that the image is not in the low luminance (S3/NO, a NO route of step S3), data in each of the fields is read out by carrying out the exposure (step S5), and the normal process for the still image is performed (step S9). If the result of the calculation shows that the image is in the low luminance (S3/YES, a YES route of step S3), the exposure and the read out of the field data in each of the fields are carried out (step S4), and the first and second field data such as a difference of the luminance are compared (step S6). Then, whether the object is moving or not is determined from a result of the comparison (step S7), and if the object is determined to be moving (S7/YES, a YES route of step S7), the normal process for the still image is performed (step S9). If the object is determined not to be moving (S7/NO, a NO route of step S7), the entire field data from the first to the third field data are added (step S8).

Here, if the object is moved in the step S7 (S7/NO), it may also be recommendable to add the entire field data from the first to the third field data in the step S8 by outputting the third field data after opening the mechanical shutter again and re-exposing the third field.

In addition, it may also be recommendable that if the object is not moved in the step S7 (S7/NO), the entire field data from the first to the third field data are added in the step S8 by outputting the third field data after slowing down a frequency of the clock of the timing generator 13 as well as opening the mechanical shutter again and re-exposing the third field.

FIGS. 7A to 7C are pattern diagrams explaining the addition for adding pixels which are in the same color in the digital camera of the present invention. FIG. 7A represents a part of the pixels in the first field, FIG. 7B represents a part of the pixels in the second field, and FIG. 7C represents a part of the pixels in the third field. In order to add the same colored pixels in FIGS. 7A to 7C, pixels denoted by reference numeral 20 in the second field shown in FIG. 7B are discarded since they are in different colors. In this manner, by adding the respective fields having the same colored pixels, sensitivity can be enhanced approximately 3 times more than a conventional image of 1 frame structured by one field with the same exposure time.

Also, if the above mentioned operations of reading out the 3 fields shown in FIGS. 4 and 5 are carried out, a size of final files (normally in JPEG file) in both of them becomes small unless an interpolation process and a magnification process are performed by a signal processing. Accordingly, it is necessary to carry out the above mentioned reading out of the 3 fields only when the file size having number of vertical pixels below ⅓ is selected. Furthermore, in the above mentioned structures, such problems cause that the size of the file becomes small without being intended by a photographer, or resolution becomes poor even the interpolation and the magnification are carried out. To avoid such problems, it is recommended to set in the camera setting or a function which makes it possible to select whether or not to carry out the adding of the pixels while in the low luminance (permission for carrying out the adding of the pixels when the object is in the low luminance) separately from the normal photographing.

As described above, according to the present invention, because the same colored pixels in the entire fields are added when the object is in the low luminance and is not moved, the present invention makes it possible to carry out the photographing in the low luminance without changing the exposure time, thus blurring by shaking can be avoided.

Also, the field data such as the difference of the luminance of images of the first field and the second field of the exposed image are compared at the time of the low luminance, and when it is determined that the there is no movement in the object, the same colored pixels of the entire fields are added after the re-exposing of the third field is carried out by opening the mechanical shutter again. Accordingly, the image in the third field becomes more distinct. Thereafter, by adding the same colored pixels in the entire fields, even more distinct images can be photographed.

As a result, because the image in the third field becomes more distinct by adding the same colored pixels in the entire fields after re-exposing the third field by opening the mechanical shutter again in the case the object is in the low luminance and has no movement, the blurring by the shaking can be avoided as well as more distinct photographing can be performed by making it possible to carry out the photographing in the low luminance without changing the exposure time.

In addition, reduction in a power consumption of the CCD is attained by lowering the frequency of the driving clock of the CCD.

Accordingly, it is possible to take the even more distinct photograph while reducing the power consumption in the entire imaging apparatus.

More specifically, because the frequency of the driving clock of the CCD is lowered as well as the same-colored pixels in the entire fields are added after re-exposing the third field by opening the mechanical shutter again in the case the object is in the low luminance and is not moved, the image in the third field becomes more distinct. Therefore, not only the blurring by the shaking can be avoided as well as more distinct photographing can be performed by making it possible to carry out the photographing in the low luminance without changing the exposure time, but also the power consumption in the entire imaging apparatus can be reduced.

Also, the above mentioned operations are performed only when the file size which can be played in one field is selected.

In the photographing operations mentioned above, the size of the final files (normally in JPEG file) in both of them becomes small unless the interpolation process and the magnification process are carried out by the signal processing. Accordingly, it is necessary to carry out the above mentioned reading out of the 3 fields only when the file size having number of vertical pixels below ⅓ is selected.

However, in the present invention, because the above mentioned operations are carried out only when the file size which can be played in the one field is selected, a shortage in the file size can be avoided.

Also, the present invention is further provided with means for carrying out the adding of pixels when the object is in the low luminance which is capable of selecting whether or not to carry out the adding of the same-colored pixels in each of the above mentioned fields.

More specifically, such problems cause the file size to becomes unintentionally small, or the file resolution to be deteriorated even though interpolation and magnification processing are carried out. To avoid such problems, it is recommended to set the setting or the function which makes it possible to select whether or not to perform the adding of pixels during the low luminance in the camera separately from the normal photographing.

According to such structure, because the function which makes it possible to select whether or not to carry out the adding of the pixels while in the low luminance is separately provided in the camera from the normal photographing, it is possible to avoid the problems that the size of the file becomes small without being intended by the photographer, or the resolution deteriorates even the interpolation process and the magnification process are carried out.

What is claimed is:

1. An imaging apparatus, comprising:
a color image pick-up device constituting an image in one frame by a plurality of fields for imaging an image of an object and having an output capable of carrying out a playback of an image in each of said fields;
a driving circuit for driving the color image pick-up device;
a timing generating circuit for generating a drive timing of said color image pick-up device; and
a signal processing device for processing an output signal of said color image pick-up device,
wherein pixels of a same color in each of all said fields are added when a luminance of said image of the object is determined to be low and when the object is determined to be not moving according to a comparison between outputted images which are in adjacent fields of said color image pick-up device.

2. The imaging apparatus according to claim 1, wherein said color image pick-up device is operated only when a size of a file which can be played in one field is selected.

3. The imaging apparatus according to claim 1, further comprising a device for selecting whether or not to add pixels at a time of low luminance which is capable of selecting whether or not to add the pixels of the same color in each of all said fields.

4. An imaging apparatus, comprising:
a color image pick-up device constituting an image in one frame by a plurality of fields for imaging an image of an object and having an output capable of carrying out a playback of an image in each of said fields;
a driving circuit for driving the color image pick-up device;
a timing generating circuit for generating a drive timing of said color image pick-up device; and
a signal processing device for processing an output signal of said color image pick-up device,
wherein pixels of a same color in each of all said fields are added after re-exposing a next field which is the next field of adjacent fields of said color image pick-up device when a luminance of said image of the object is determined to be low and when the object is determined to be not moving according to a comparison between outputted images which are in said adjacent fields of said color image pick-up device.

5. The imaging apparatus according to claim 4, further comprising a variable clock generator capable of generating multiple clock frequencies for said timing generating circuit;
wherein the pixels of the same color in each of all said fields are added after lowering a speed of a clock frequency of said timing generating circuit and re-exposing the next field which is the next of the adjacent fields of said color image pick-up device when the luminance of said image of the object is determined to be low and when the object is determined to be not moving according to a comparison between the outputted images which are in said adjacent fields of said color image pick-up device.

6. An imaging apparatus, comprising:
a color image pick-up device constituting an image in one frame by a plurality of fields for imaging an image of an object and having an output capable of carrying out a playback of an image in each of said fields;
a driving circuit for driving the color image pick-up device;
a timing generating circuit for generating a drive timing of said color image pick-up device;
a signal processing device for processing an output signal of said color image pick-up device; and
a controller configured to add pixels of a same color in each of all said fields when a luminance of said image of the object is determined to be low and when the object is determined to be not moving according to a comparison between outputted images which are in adjacent fields of said color image pick-up device.

7. The imaging apparatus according to claim 6, further comprising a variable clock generator capable of generating multiple clock frequencies for said timing generating circuit,
wherein the controller adds the pixels of the same color in each of all said fields after lowering a speed of a clock frequency of said timing generating circuit and re-exposing the next field which is the next field of the adjacent fields of said color image pick-up device which the luminance of said image of the object is determined to be low and when the object is determined to be not moving according to the comparison between the outputted images which are in said adjacent fields of said color image pick-up device.

8. The imaging apparatus according to claim 6, wherein said color image pick-up device is operated only when a size of a file which can be played in one field is selected.

9. The imaging apparatus according to claim 6, further comprising a device for selecting whether or not to add pixels at a time of low luminance which is capable of selecting whether or not to add the pixels of the same color in each of all said fields.

10. An imaging apparatus, comprising:
a color image pick-up device constituting an image in one frame by a plurality of fields for imaging an image of an object and having an output capable of carrying out a playback of an image in each of said fields;
a driving circuit for driving the color image pick-up device;
a timing generating circuit for generating a drive timing of said color image pick-up device;
a signal processing device for processing an output signal of said color image pick-up device; and
a controller configured to add pixels of same color in each of all said fields after re-exposing a next field which is next of adjacent fields of said color image pick-up device when a luminance of said image of the object is determined to be low and when the object is determined to be not moving according to a comparison between outputted images which are in said adjacent fields of said color image pick-up device.

* * * * *